(12) United States Patent
Schneider et al.

(10) Patent No.: US 7,921,830 B2
(45) Date of Patent: Apr. 12, 2011

(54) TEMPERATURE CONTROLLED VENTURI FOR USE WITH AN EGR SYSTEM IN AN INTERNAL COMBUSTION ENGINE

(75) Inventors: Jason Schneider, Waterloo, IA (US); Bradley R. Watkins, Cedar Falls, IA (US); Laurentiu Dobrila, Cedar Falls, IA (US); Nathan Erickson, Denver, IA (US); Randy Scarf, Gladbrook, IA (US); Doug Brocco, Waterloo, IA (US)

(73) Assignee: Deere & Company, Moline, IL (US)

( * ) Notice: Subject to any disclaimer, the term of this patent is extended or adjusted under 35 U.S.C. 154(b) by 114 days.

(21) Appl. No.: 12/342,674

(22) Filed: Dec. 23, 2008

(65) Prior Publication Data
US 2010/0154758 A1 Jun. 24, 2010

(51) Int. Cl.
*F02B 47/08* (2006.01)
*F02B 47/04* (2006.01)
(52) U.S. Cl. ............................ 123/568.17; 123/568.12
(58) Field of Classification Search ............ 123/568.17, 123/568.18, 568.12, 568.11; 60/605.2, 606
See application file for complete search history.

(56) References Cited

U.S. PATENT DOCUMENTS

| | | | | |
|---|---|---|---|---|
| 2,354,151 A | * | 7/1944 | Skoglund | 239/127.3 |
| 3,188,801 A | * | 6/1965 | Prosser | 138/38 |
| 4,426,848 A | * | 1/1984 | Stachowicz | 60/605.2 |
| 4,671,060 A | | 6/1987 | Wilkens | |
| 5,331,930 A | * | 7/1994 | McWhorter | 123/79 R |
| 5,857,838 A | * | 1/1999 | Wagner, Jr. | 417/173 |
| 6,301,887 B1 | | 10/2001 | Gorel et al. | |
| 6,351,946 B1 | | 3/2002 | Faletti | |
| 6,786,210 B2 | * | 9/2004 | Kennedy et al. | 123/568.12 |
| 6,935,319 B2 | | 8/2005 | Aupperle et al. | |
| 6,978,772 B1 | | 12/2005 | Dorn et al. | |
| 7,380,544 B2 | | 6/2008 | Raduenz et al. | |
| 2006/0021346 A1 | | 2/2006 | Whelan et al. | |
| 2006/0061725 A1 | | 3/2006 | Chiu et al. | |
| 2009/0084193 A1 | * | 4/2009 | Cerabone et al. | 73/861.64 |

\* cited by examiner

*Primary Examiner* — Mahmoud Gimie
(74) *Attorney, Agent, or Firm* — Taylor IP, P.C.

(57) ABSTRACT

An EGR venturi for use in an EGR system of an IC engine includes a body defining a converging inlet section, a throat, and an interior liquid heat exchange chamber adjacent to the throat.

27 Claims, 6 Drawing Sheets

US 7,921,830 B2

TEMPERATURE CONTROLLED VENTURI FOR USE WITH AN EGR SYSTEM IN AN INTERNAL COMBUSTION ENGINE

FIELD OF THE INVENTION

The present invention relates to internal combustion engines, and, more particularly, to exhaust gas recirculation systems in such engines.

BACKGROUND OF THE INVENTION

An internal combustion (IC) engine may include an exhaust gas recirculation (EGR) system for controlling the generation of undesirable pollutant gases and particulate matter in the operation of IC engines. EGR systems primarily recirculate the exhaust gas by-products into the intake air supply of the IC engine. The exhaust gas which is reintroduced to the engine cylinder reduces the concentration of oxygen therein, which in turn lowers the maximum combustion temperature within the cylinder and slows the chemical reaction of the combustion process, decreasing the formation of nitrous oxides (NOx). Furthermore, the exhaust gases typically contain unburned hydrocarbons which are burned on reintroduction into the engine cylinder, which further reduces the emission of exhaust gas by-products which would be emitted as undesirable pollutants from the IC engine.

An IC engine may also include one or more turbochargers for compressing a fluid which is supplied to one or more combustion chambers within corresponding combustion cylinders. Each turbocharger typically includes a turbine driven by exhaust gases of the engine and a compressor which is driven by the turbine. The compressor receives the fluid to be compressed and supplies the fluid to the combustion chambers. The fluid which is compressed by the compressor may be in the form of combustion air or a fuel and air mixture.

When utilizing EGR in a turbocharged diesel engine, the exhaust gas to be recirculated is preferably removed upstream of the exhaust gas driven turbine associated with the turbocharger. In many EGR applications, the exhaust gas is diverted by a poppet-type EGR valve directly from the exhaust manifold. The percentage of the total exhaust flow which is diverted for introduction into the intake manifold of an internal combustion engine is known as the EGR rate of the engine.

With an EGR system using an EGR valve as described above, it is desirable to recirculate an amount of exhaust gas within a relatively small tolerance range around a target EGR rate. Venturis are widely used as flow meters on competitive diesel engines to measure exhaust gas flow recirculated to the intake manifold. Venturis are useful because a pressure differential exists across the device which can be correlated to a mass flow rate.

A problem with conventional venturis used in an EGR system is that diesel combustion products build up in the venturi and affect the internal geometry of the venturi, in turn affecting the differential pressure measurement across the venturi. Accurate measurement of EGR is essential to controlling the emissions of the engine.

Another problem with conventional venturis used in an EGR system is that the sensor for flow measurement is sensitive to temperature both for the life of the sensor (overheating) and repeatability of the sensor (temperature changes). In normal practice the sensor must be protected from the heat of combustion products by either remote mounting or shielding to prevent damage. On the other hand, ambient temperature variation reduces the repeatability of the sensor.

What is needed in the art is a venturi for an EGR system which is not subject to overheating and has a higher reliability.

SUMMARY OF THE INVENTION

The invention in one form is directed to an EGR venturi for use in an EGR system for an IC engine. The EGR venturi includes a body defining a converging inlet section, a throat, and an interior liquid heat exchange chamber adjacent to the throat.

The invention in another form is directed to an internal combustion engine, including a block defining at least one combustion cylinder and a liquid coolant system, an intake manifold fluidly coupled with at least one combustion cylinder, an exhaust manifold fluidly coupled with at least one combustion cylinder, and an EGR venturi fluidly coupled between the exhaust manifold and the intake manifold. The EGR venturi includes a body defining a converging inlet section which is fluidly coupled with the exhaust manifold, a throat, and an interior liquid heat exchange chamber adjacent to the throat. The heat exchange chamber is in fluid communication with the liquid coolant system.

DETAILED DESCRIPTION OF THE INVENTION

Figure 1:
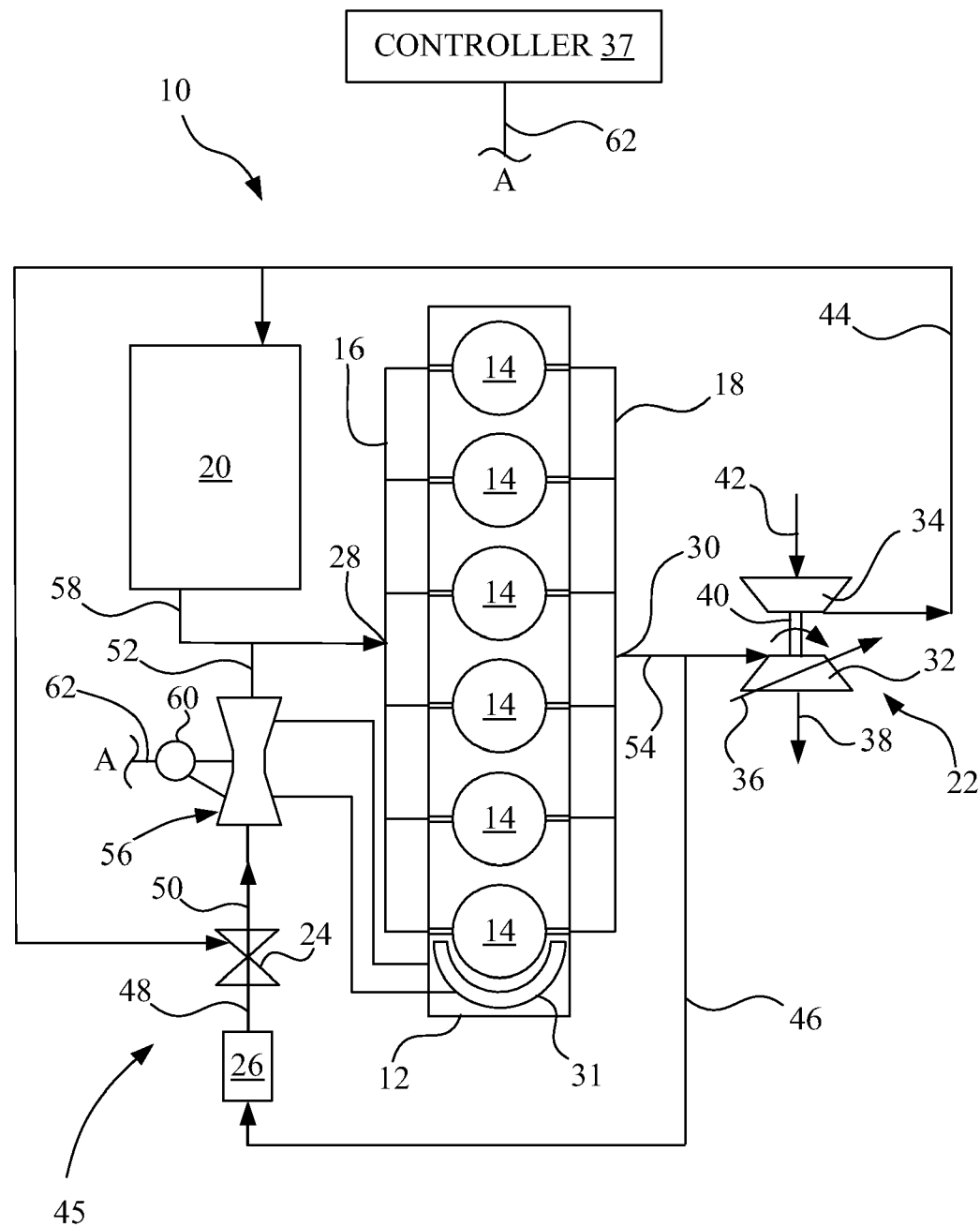
FIG. 1 is a schematic view of an IC engine including an EGR system with an embodiment of a venturi of the present invention.

Referring now to the drawings, and more particularly to FIG. 1, there is shown an embodiment of an IC engine 10 of the present invention, which generally includes a block 12 having a plurality of combustion cylinders 14, intake manifold 16, exhaust manifold 18, charge air cooler 20, turbocharger 22, EGR valve 24, EGR cooler 26 and EGR venturi 56. In the embodiment shown, IC engine 10 is a diesel engine which is incorporated into a work machine, such as an agricultural tractor or combine, but may be differently configured, depending upon the application.

Block 12 is typically a cast metal block which is formed to define combustion cylinders 14. In the embodiment shown, block 12 includes six combustion cylinders 14, but may include a different number depending upon the application. Intake manifold 16 and exhaust manifold 18 are also typically formed from cast metal, and are coupled with block 12 in conventional manner, such as by using bolts and gaskets. Intake manifold 16 and exhaust manifold 18 are each in fluid communication with combustion cylinders 14. Intake manifold 16 receives charge air from charge air cooler 20 at intake manifold inlet 28, and supplies charge air (which may be air or a fuel/air mixture) to combustion cylinders 14, such as by using fuel injectors (not shown).

Similarly, exhaust manifold 18 is in fluid communication with combustion cylinders 14, and includes an outlet 30 from which exhaust gas from combustion cylinders 14 is discharged to turbocharger 22.

Block 12 also typically includes a liquid coolant system with a number of internal liquid coolant passages 31 for cooling IC engine 10, in known manner. Only a single liquid coolant passage 31 is shown in FIG. 1 for simplicity sake. Liquid coolant passage 31 is in fluid communication with EGR venturi 56, as will be described in more detail below.

Turbocharger 22 includes a variable geometry turbine (VGT) 32 and a compressor 34. VGT 32 is adjustably controllable as indicated by line 36, and includes an actuatable element which is controlled electronically using a controller 37. For example, VGT 32 may be actuated by changing the position of turbine blades, a variable size orifice, or other actuatable elements. The turbine within VGT 32 is driven by exhaust gas from exhaust manifold 18, and is exhausted to the environment, as indicated by arrow 38.

VGT 32 mechanically drives compressor 34 through a rotatable shaft 40. Compressor 34 is a fixed geometry compressor in the embodiment shown. Compressor 34 receives combustion air from the ambient environment as indicated by line 42, and discharges the compressed combustion air via line 44 to charge air cooler 20. As a result of the mechanical work through the compression of the combustion air, the heated charge air is cooled in charge air cooler 20 prior to being introduced at inlet 28 of intake manifold 16.

EGR valve 24 and EGR cooler 26 are part of an EGR system 45 which also includes a first fluid line 46, second fluid line 48, third fluid line 50 and fourth fluid line 52. The term fluid line, as used herein, is intended broadly to cover a conduit for transporting a gas such as exhaust gas and/or combustion air, as will be understood hereinafter.

First fluid line 46 is coupled at one end thereof with a fluid line 54 interconnecting exhaust manifold outlet 30 with VGT 32. First fluid line 46 is coupled at an opposite end thereof with EGR cooler 26. Second fluid line 48 fluidly interconnects EGR cooler 26 with EGR valve 24. Third fluid line 50 fluidly interconnects EGR valve 24 with EGR venturi 56. Fourth fluid line 52 fluidly interconnects EGR venturi 56 with fluid line 58 extending between charge air cooler 20 and inlet 28 of intake manifold 16.

The controllable components of IC engine 10 shown in FIG. 1 are generally under the control of controller 37. For example, controller 37 can control operation of VGT 32 and EGR valve 24. Controller 37 also receives signals from a pressure sensor 60 associated with EGR venturi 56 as indicated by line 62, letter A.

Figure 2:
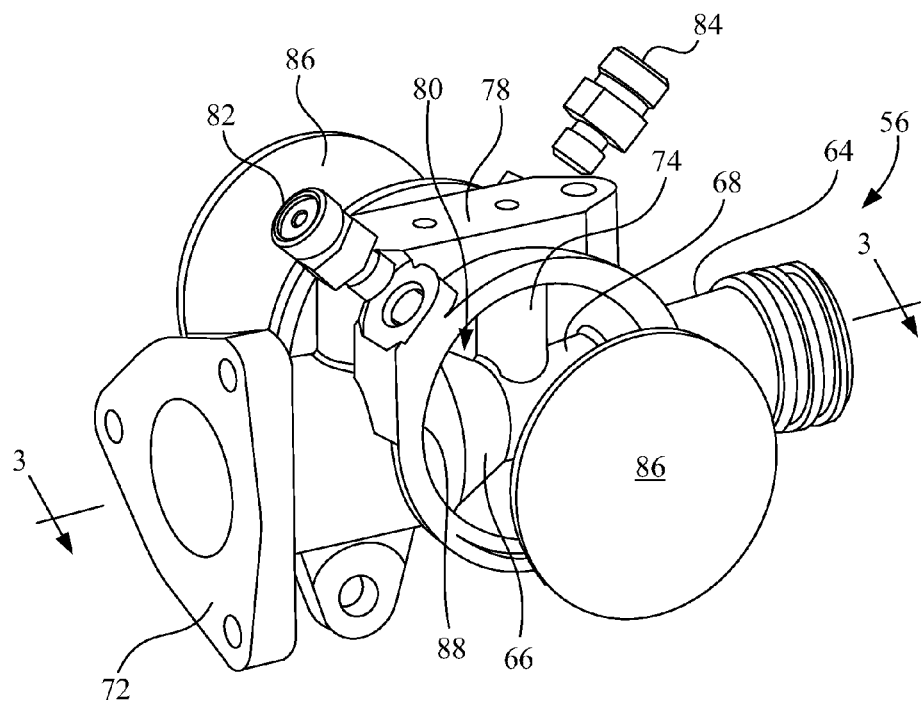
FIG. 2 is a perspective view of an embodiment of a venturi of the present invention, such as may be utilized with the EGR system shown in FIG. 1, with the cover plates removed.
Figure 3:
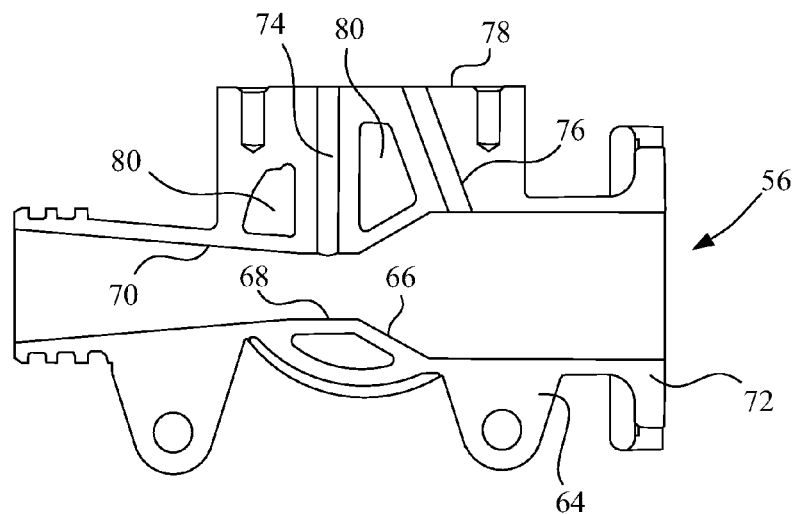
FIG. 3 is a sectional view of the venturi shown in FIG. 2, taken along line 3-3.

Referring now to FIGS. 2 and 3, EGR venturi 56 will be described in greater detail. EGR venturi 56 includes a body 64 to which is mounted a pressure sensor 60 (shown schematically in FIG. 1, but not shown in FIGS. 2 and 3). Body 64 defines a converging inlet section 66, throat 68 and diverging outlet section 70. Body 64 also includes a mounting flange 72 at the inlet side of converging inlet section 66. Converging inlet section 66 is fluidly coupled with exhaust manifold 18 (by way of EGR cooler 26 and EGR valve 24), and diverging outlet section 70 is fluidly coupled with intake manifold 16.

Body 64 also includes a first sensor port 74 in communication with throat 68, and a second sensor port 76 in communication with converging inlet section 66. Each sensor port 74 and 76 terminates at a mounting surface 78 for mounting the pressure sensor 60. By sensing the differential pressure within both the converging inlet section 66 and throat 68, the mass flow rate of the EGR gas can be determined and compared with a target EGR flow through EGR valve 24.

According to an aspect of the present invention, EGR venturi 56 is temperature controlled using liquid coolant associated with IC engine 10. For example, the liquid coolant can be from a liquid coolant passage 31 associated with the primary liquid coolant system (FIG. 1), or could be liquid coolant associated with EGR cooler 26. More particularly, EGR venturi 56 includes an interior liquid heat exchange chamber 80 adjacent to throat 68. Heat exchange chamber 80 is in fluid communication with the liquid coolant system of IC engine 10 via inlet port 82 and outlet port 84. Heat exchange chamber 80 at least partially surrounds both the first sensor port 74 and second sensor port 76. In other words, both the first sensor port 74 and second sensor port 76 are essentially constructed as tubes which extend through the heat exchange chamber 80. As shown in FIGS. 2 and 3, heat exchange chamber 80 may also at least partially surround converging inlet section 66 and/or diverging outlet section 70.

A pair of removable cover plates 86 are positioned on generally opposite sides of body 64 and cover corresponding openings 88. Each opening 88 is in communication with heat exchange chamber 80. Cover plates 86 are structured and arranged so as to allow body 64 to be cast as a single part casting.

From the foregoing description, it is apparent that the temperature controlled EGR venturi 56 of the present invention uses engine coolant around the throat 68 and pressure ports 74 and 76 of the venturi to both allieviate buildup of combustion products and modulate the temperature of the sensor 60. Water condensate (from exhaust products) in the venturi is a leading contributor for allowing soot to collect and build up on the internal geometry of the venturi. Reduction of combustion product build up is managed by maintaining a venturi wall temperature that is above the condensation point for water. By keeping water vapor from condensing to liquid on the inside of the venturi, the combustion products build up is minimized.

The coolant flow in EGR venturi 56 also serves a second purpose—that is to regulate the temperature of the differential pressure sensor 60 within a given range to maintain measurement accuracy and repeatability at various ambient conditions and protect the sensor 60 from overheating.

Figure 4:
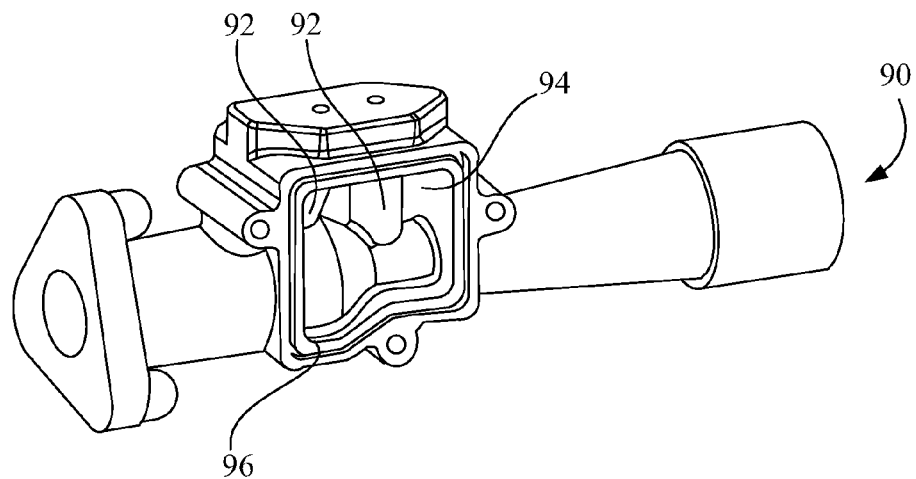
FIG. 4 is a perspective view of another embodiment of a venturi of the present invention, with the cover plates removed.
Figure 5:
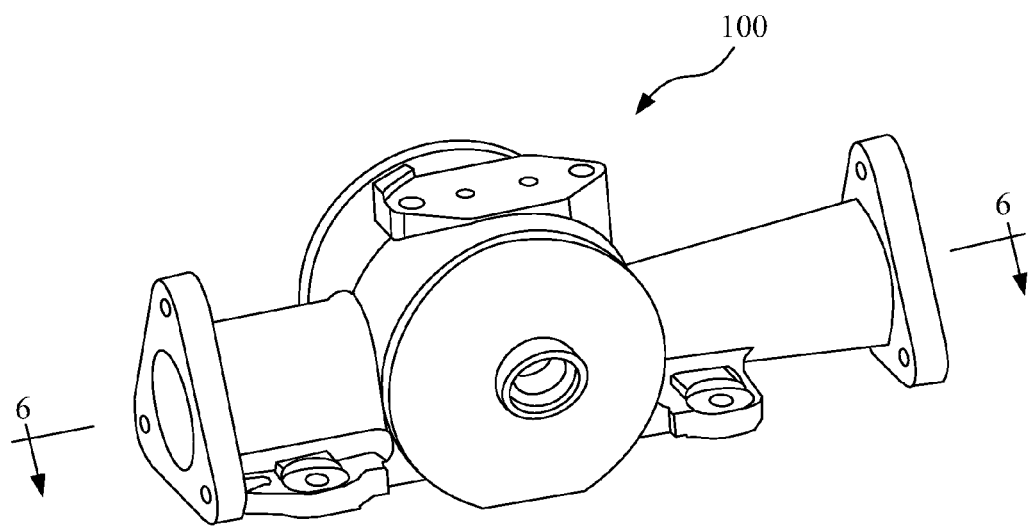
FIG. 5 is a perspective view of another embodiment of a venturi of the present invention, with the cover plates installed.
Figure 6:
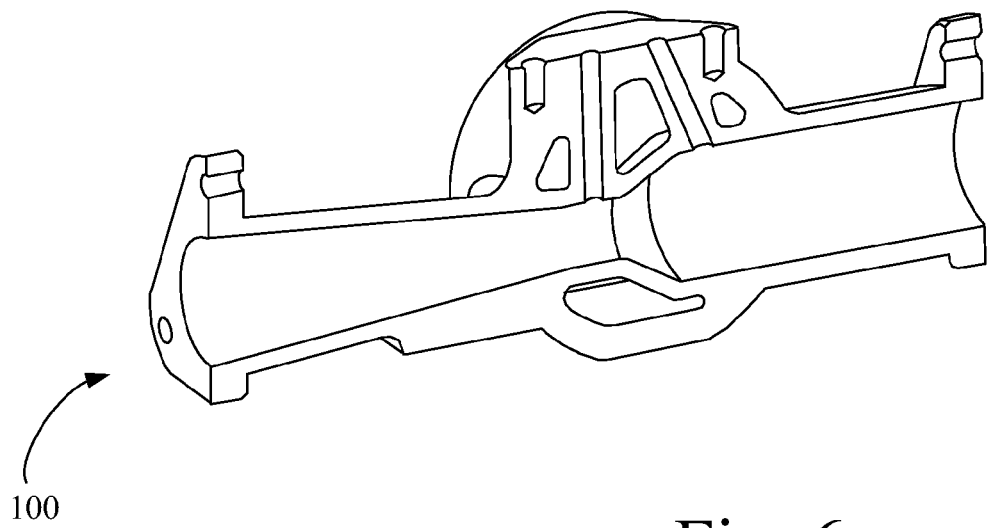
FIG. 6 is a sectional view of the venturi shown in FIG. 5, taken along line 6-6.
Figure 7:
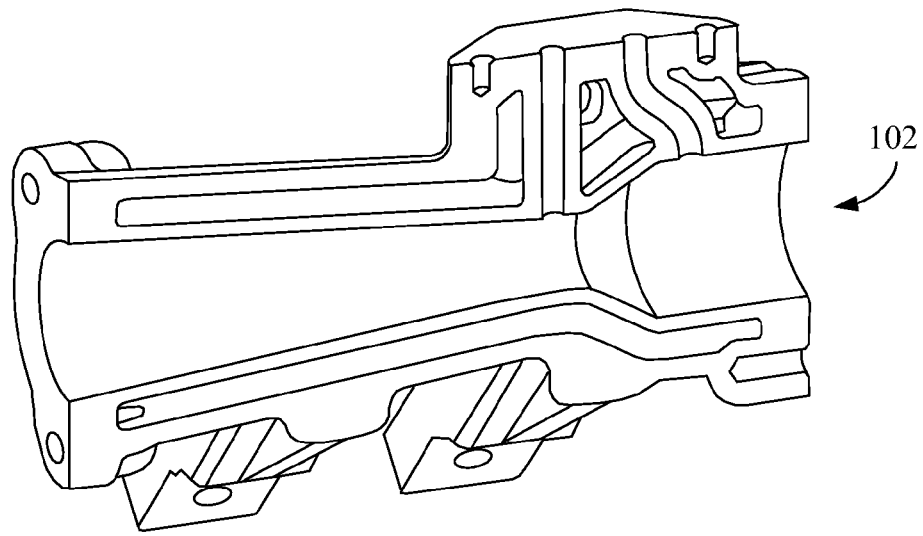
FIG. 7 is a sectional view of another embodiment of a venturi of the present invention.
Figure 8:
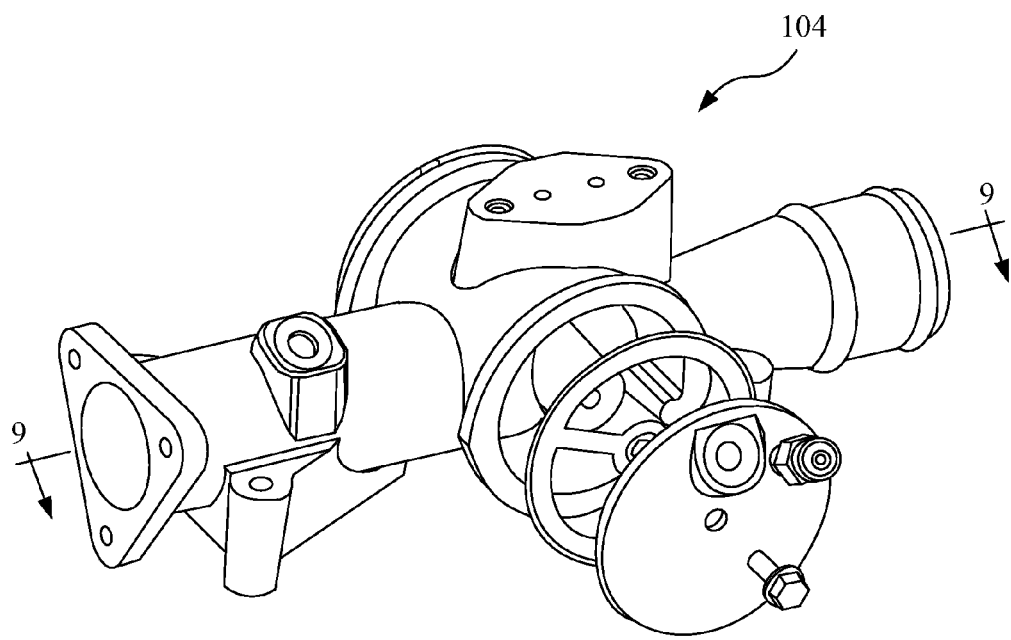
FIG. 8 is a perspective view of another embodiment of a venturi of the present invention, with the cover plates removed.
Figure 9:
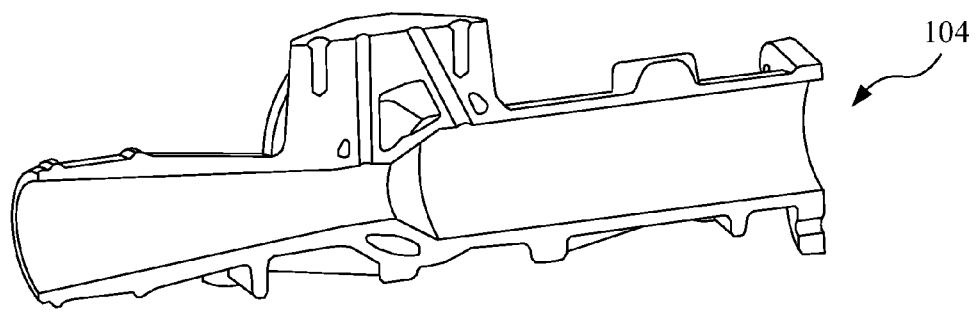
FIG. 9 is a sectional view of the venturi shown in FIG. 8, taken along line 9-9.

FIG. 4 illustrates another embodiment of an EGR venturi 90 of the present invention. EGR venturi 90 again includes a pair of tube shaped sensor ports 92, a liquid coolant chamber 94 surrounding a portion of the inlet section, throat and outlet section, and a pair of opposite openings 96 to which attach removable cover plates (not shown).

Three other embodiments of EGR venturis 100, 102 and 104 are shown in FIGS. 5-6, 7 and 8-9, respectively. The features of these EGR venturi embodiments are believed to be self evident from the foregoing detailed description of the present invention, and therefore will not be described in greater detail herein.

Figure 10:
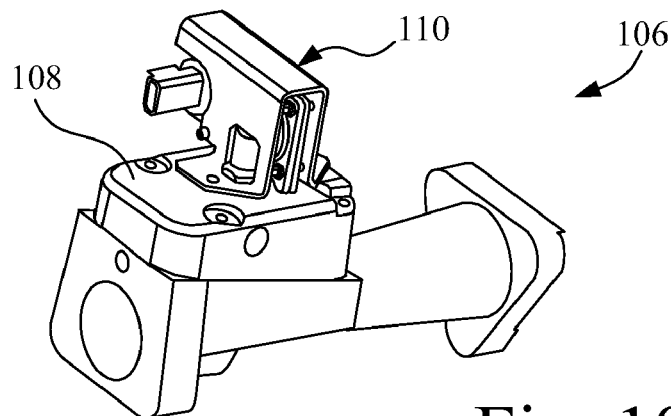
FIGS. 10-12 illustrate another embodiment of a venturi of the present invention.
Figure 11:
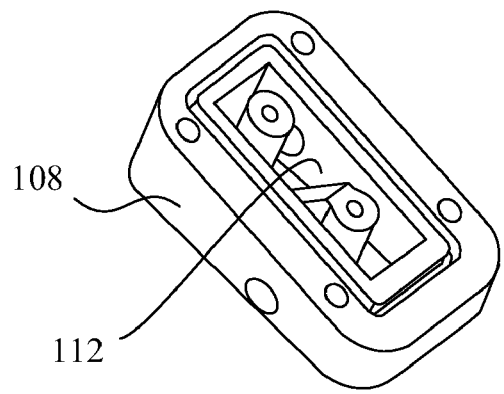
Figure 12:
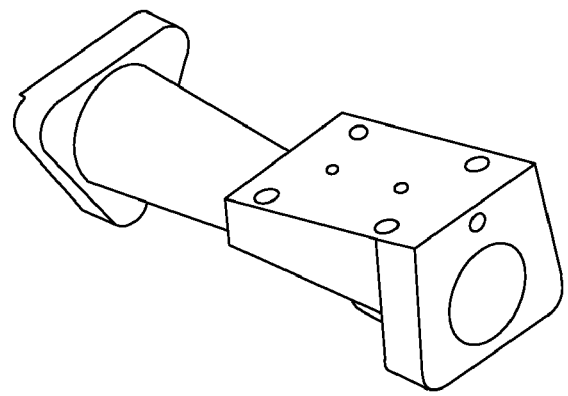

A further embodiment of an EGR venturi 106 is shown in FIGS. 10-12. EGR venturi 106 has a multi-part body with a wedge shaped body portion 108 to which is mounted the sensor assembly 110. Wedge shaped body portion 108 defines the interior liquid heat exchange chamber 112 for cooling EGR venturi 106. The features of EGR venturi 106 are otherwise similar to the embodiments described above, and therefore will not be described in greater detail herein.

In summary, the temperature controlled EGR venturi of the present invention includes a venturi with a coolant manifold integrated around the exterior of the gas passages and two cover plates to seal coolant inside the manifold. Two ports for coolant input and output allow the fluid to flow through the manifold. The coolant transfers heat to the venturi via this manifold. The design of the present invention gives performance advantages over typical venturi designs because of temperature control of the inside walls to prevent condensation/soot build-up, temperature control of the pressure sensor to improve accuracy/repeatability, and direct sensor mounting to the venturi. The production intent design using removable cover plates provides a manufacturing advantage because the casting does not require a core and it allows for reduction in precious metal but still allows good surface area for coolant to venturi heat transfer around pressure ports and the throat.

Having described the preferred embodiment, it will become apparent that various modifications can be made without departing from the scope of the invention as defined in the accompanying claims.

The invention claimed is:

1. An internal combustion (IC) engine, comprising:
   a block defining at least one combustion cylinder and a liquid recirculating coolant system;
   an intake manifold fluidly coupled with at least one said combustion cylinder;
   an exhaust manifold fluidly coupled with at least one said combustion cylinder;
   an EGR venturi fluidly coupled between said exhaust manifold and said intake manifold, said EGR venturi including a body defining a converging inlet section which is fluidly coupled with said exhaust manifold, a throat, and an interior liquid heat exchange chamber adjacent said throat, said heat exchange chamber being in fluid communication with said recirculating liquid coolant system ,wherein said body includes a first sensor port in communication with said throat and said first sensor port is substantially surrounded by said heat exchange chamber.

2. The IC engine of claim 1, wherein said body includes a second sensor port in communication with said converging inlet section.

3. The IC engine of claim 2, wherein said second sensor port is substantially surrounded by said heat exchange chamber.

4. The IC engine of claim 1, including at least one removable cover plate, each said cover plate covering a corresponding opening in said body which is in communication with said heat exchange chamber.

5. The IC engine of claim 4, wherein said at least one removable cover plate comprises a pair of cover plates which respectively cover a corresponding pair of said openings on generally opposite sides of said body.

6. The IC engine of claim 5, wherein said pair of cover plates are structured and arranged so as to allow said body to be cast as a single part casting.

7. The IC engine of claim 1, wherein said heat exchange chamber is adjacent at least a portion of said converging inlet section.

8. The IC engine of claim 1, wherein said body includes a diverging outlet section, and wherein said heat exchange chamber is adjacent at least a portion of said diverging outlet section.

9. The IC engine of claim 1, wherein said body includes an inlet port and an outlet port in communication with said heat exchange chamber.

10. An exhaust gas recirculation (EGR) system for an internal combustion engine (IC), the internal combustion engine including an intake manifold, an exhaust manifold, and a recirculating liquid coolant system, said EGR system comprising: an EGR venturi, said EGR venturi including a body defining a converging inlet section which is fluidly coupled with said exhaust manifold, a throat, and an interior liquid heat exchange chamber adjacent said throat, said heat exchange chamber being in fluid communication with said recirculating liquid coolant system, wherein said body includes a first sensor port in communication with said throat and said first sensor port is substantially surrounded by said heat exchange chamber.

11. The EGR system of claim 10, wherein said body includes a second sensor port in communication with said converging inlet section.

12. The EGR system of claim 11, wherein said second sensor port is substantially surrounded by said heat exchange chamber.

13. The EGR system of claim 10, including at least one removable cover plate, each said cover plate covering a corresponding opening in said body which is in communication with said heat exchange chamber.

14. The EGR system of claim 13, wherein said at least one removable cover plate comprises a pair of cover plates which respectively cover a corresponding pair of said openings on generally opposite sides of said body.

15. The EGR system of claim 14, wherein said pair of cover plates are structured and arranged so as to allow said body to be cast as a single part casting.

16. The EGR system of claim 10, wherein said heat exchange chamber is adjacent at least a portion of said converging inlet section.

17. The EGR system of claim 10, wherein said body includes a diverging outlet section, and wherein said heat exchange chamber is adjacent at least a portion of said diverging outlet section.

18. The EGR system of claim 10, wherein said body includes an inlet port and an outlet port in communication with said heat exchange chamber.

19. An exhaust gas recirculation (EGR) venturi having an exhaust gas flow passage for use in an EGR system of an internal combustion (IC) engine, said EGR venturi comprising a body defining a converging inlet section, a throat, and an interior liquid heat exchange chamber adjacent said throat and not in fluid communication with said exhaust gas flow passage ,wherein said body includes a first sensor port in communication with said throat and said first sensor port is substantially surrounded by said heat exchange chamber.

20. The EGR venturi of claim 19, wherein said body includes a second sensor port in communication with said converging inlet section.

21. The EGR venturi of claim 20, wherein said second sensor port is substantially surrounded by said heat exchange chamber.

22. The EGR venturi of claim 19, including at least one removable cover plate, each said cover plate covering a corresponding opening in said body which is in communication with said heat exchange chamber.

23. The EGR venturi of claim 22, wherein said at least one removable cover plate comprises a pair of cover plates which respectively cover a corresponding pair of said openings on generally opposite sides of said body.

24. The EGR venturi of claim 23, wherein said pair of cover plates are structured and arranged so as to allow said body to be cast as a single part casting.

25. The EGR venturi of claim 19, wherein said heat exchange chamber is adjacent at least a portion of said converging inlet section.

26. The EGR venturi of claim 19, wherein said body includes a diverging outlet section, and wherein said heat exchange chamber is adjacent at least a portion of said diverging outlet section.

27. The EGR venturi of claim 19, wherein said body includes an inlet port and an outlet port in communication with said heat exchange chamber.

* * * * *

UNITED STATES PATENT AND TRADEMARK OFFICE
CERTIFICATE OF CORRECTION

PATENT NO. : 7,921,830 B2  Page 1 of 1
APPLICATION NO. : 12/342674
DATED : April 12, 2011
INVENTOR(S) : Schneider et al.

It is certified that error appears in the above-identified patent and that said Letters Patent is hereby corrected as shown below:

On the Title page Item (56)
Under U.S. PATENT DOCUMENTS, please delete "2006/0061725 A1 3/2006 Chiu et al.", and substitute therefore --2006/0060175 A1 3/2006 Liu et al.--.

Signed and Sealed this
Eighth Day of November, 2011

David J. Kappos
*Director of the United States Patent and Trademark Office*